(12) United States Patent
Pennisi

(10) Patent No.: US 8,322,957 B1
(45) Date of Patent: Dec. 4, 2012

(54) CHUCK AND LOCK SYSTEM WITH EXTENDABLE BRACE FOR PREVENTING FALLING OF FLATBED TRUCK LOADS

(76) Inventor: Anthony Pennisi, Westbury, NY (US)

( * ) Notice: Subject to any disclaimer, the term of this patent is extended or adjusted under 35 U.S.C. 154(b) by 0 days.

(21) Appl. No.: 13/134,344

(22) Filed: Jun. 6, 2011

(51) Int. Cl.
 *B61D 45/00* (2006.01)
(52) U.S. Cl. .......................................................... 410/96
(58) Field of Classification Search ............... 410/36, 410/47, 49, 50, 77, 85, 96, 97, 120
 See application file for complete search history.

(56) References Cited

U.S. PATENT DOCUMENTS

| | | | | |
|---|---|---|---|---|
| 1,745,050 | A * | 1/1930 | Romine | 410/34 |
| 1,793,059 | A * | 2/1931 | Chambers | 410/36 |
| 2,061,937 | A * | 11/1936 | Fay | 211/49.1 |
| 2,449,300 | A * | 9/1948 | Jones | 410/106 |
| 3,091,193 | A * | 5/1963 | Thomas | 105/386 |
| 3,307,691 | A * | 3/1967 | Vallebona | 206/451 |
| 3,459,326 | A * | 8/1969 | Betjeman | 220/1.5 |
| 3,504,404 | A * | 4/1970 | Strombeck et al. | 24/16 R |
| 3,843,156 | A * | 10/1974 | Alfriend et al. | 410/49 |
| 4,106,735 | A * | 8/1978 | Partain et al. | 410/49 |
| 4,464,089 | A | 8/1984 | Allen | |
| 4,498,824 | A | 2/1985 | Kinkle | |
| 4,770,578 | A * | 9/1988 | Coleman | 410/34 |
| 4,880,342 | A | 11/1989 | Pradovic | |
| 5,340,250 | A * | 8/1994 | Meriwether et al. | 410/99 |
| 5,876,164 | A * | 3/1999 | Hamelin et al. | 410/35 |
| 5,964,557 | A * | 10/1999 | Eng | 410/37 |
| 5,993,126 | A * | 11/1999 | Janzen | 410/37 |
| 6,074,143 | A | 6/2000 | Langston | |
| 6,149,360 | A * | 11/2000 | Billotte | 410/37 |
| 6,264,410 | B1 * | 7/2001 | Keip et al. | 410/35 |
| 6,299,395 | B1 * | 10/2001 | Eriksson | 410/37 |
| 6,739,811 | B1 | 5/2004 | Petelka | |
| 6,981,828 | B2 | 1/2006 | Davies | |
| 7,306,415 | B2 * | 12/2007 | Halliar | 410/77 |
| 7,410,335 | B2 | 8/2008 | Scott | |
| 7,503,738 | B1 * | 3/2009 | Doyle | 410/152 |
| 7,614,833 | B2 * | 11/2009 | Manesis | 410/100 |
| 7,832,969 | B2 * | 11/2010 | Lambousis | 410/34 |
| D632,423 | S | 2/2011 | Canfield | |
| 8,152,425 | B2 * | 4/2012 | Hazen | 410/36 |

* cited by examiner

*Primary Examiner* — H Gutman
(74) *Attorney, Agent, or Firm* — Alfred M. Walker

(57) ABSTRACT

A chuck and lock system prevents the load on a flatbed truck from shifting at the destination during offloading. The system includes one or more extendable brace units or vertical stakes and a movable chuck and lock, which operates as a socket locking each extendable brace in place. The chuck and lock unit is attached to dunnage underneath the load. The units can be spaced on either side of the load where needed. The load is held on each side between the vertical braces adjacent to the load and which are adjusted for the height of the load. Straps are supported by the extendable braces and go over the load. At the destination, prior to unloading, all straps or lashings are removed or loosened. The vertical braces prevent the load from shifting sideways and causing an accident. The load is offloaded by a load lift.

13 Claims, 5 Drawing Sheets

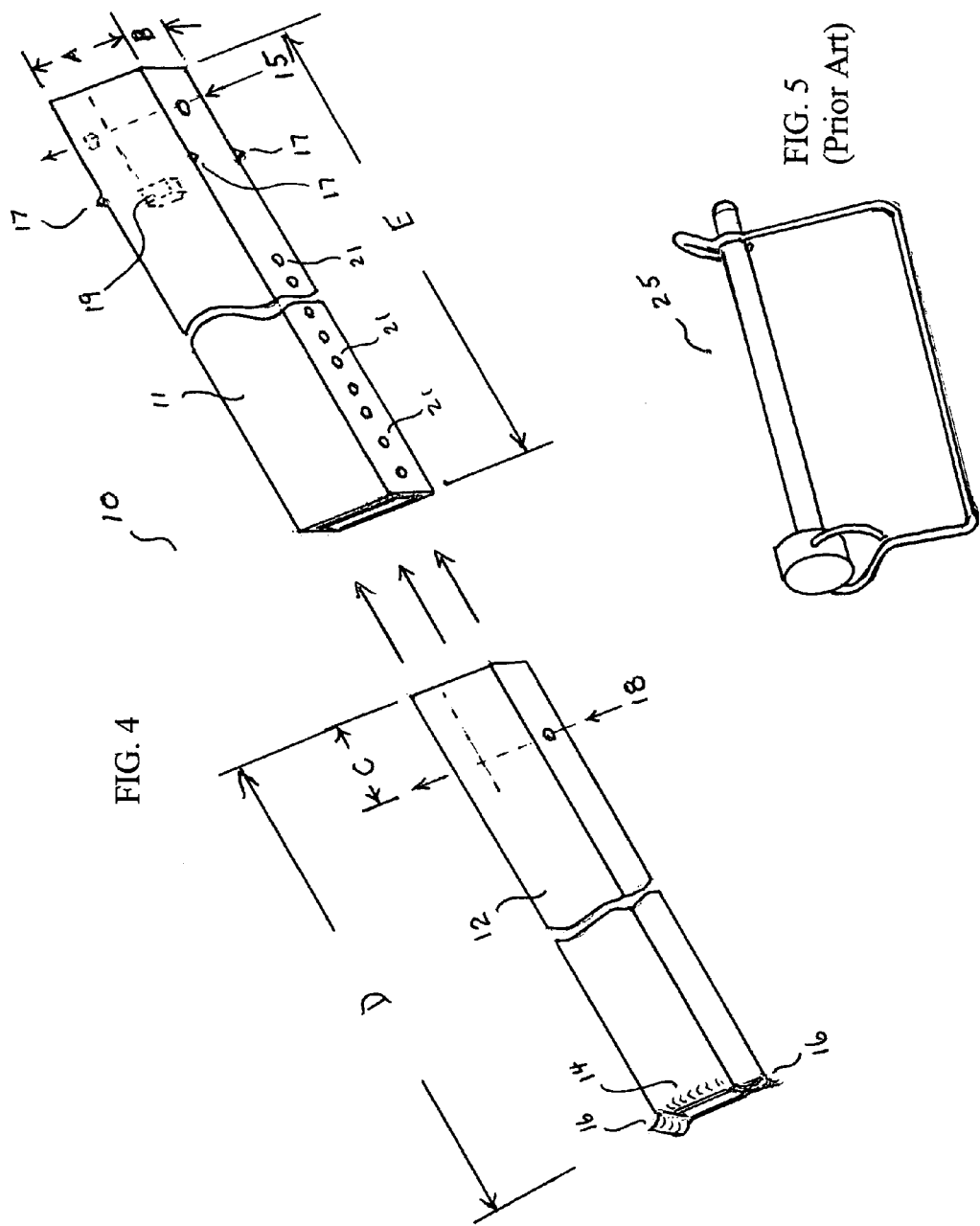

CHUCK AND LOCK SYSTEM WITH EXTENDABLE BRACE FOR PREVENTING FALLING OF FLATBED TRUCK LOADS

FIELD OF THE INVENTION

The present invention relates to worker safety and for preventing loads from shifting while being transported by flatbed trucks.

BACKGROUND OF THE INVENTION

There are many guidelines and techniques for preventing loads from shifting while being transported by flatbed trucks. If they are followed, these instructions do prevent accidents by showing the proper use of tie-down lashings, ideal location of load on a truck bed, and the use of dunnage to clamp the load more effectively. However, there is little guidance and apparatus available to prevent the load from shifting and possibly falling from the vehicle during offloading at a destination. Such accidents can cause serious injury and even death.

In this invention several terms, such as "dunnage", "dunnage timbers" "braces" and "stakes", which may be common in the trucking industry, will be used. Dunnage refers to any material which is not part of an actual load to be transported placed under or around a load as an aid in lashing or tying a load properly to prevent shifting. In practice, lengths of wood (i.e.—dunnage timbers) are placed between the truck bed and the load; this both protects the truck bed from wear and elevates the load for easy handling by lift trucks. Stakes, which are typically lengths of wood such as 2 by 4's, are used vertically in stake pockets (i.e.—form fitting recesses) sometimes available at the sides of flat bed trucks to support to contain loads at the side.

OBJECTS OF THE INVENTION

It is an object of the present invention to provide for worker safety for drivers and unloaders of flatbed trucks.

It is also an object of the present to prevent loads from shifting while being transported by and unloaded from flatbed trucks.

Other objects which become apparent from the following description of the present invention.

SUMMARY OF THE INVENTION

In keeping with these objects and others which may become apparent, the present invention is directed to a system and methods to prevent the load on a flatbed truck from shifting at the destination during offloading. The system is comprised of two major units, an extensible (telescoping) brace or vertical stake and a movable chuck and lock which operates like a movable stake socket with means to lock the extendable brace in place. In fact, the extendable brace unit can also be used in stake sockets for use in truck beds having such features. The chuck and lock unit is attached to dunnage underneath the load. It offers the convenience of spacing such units on either side of the load exactly where needed based on the length of the load. Unlike actual truck stake sockets which are fixed, since the dunnage timbers can be cut or adjusted to the width of the load and also moved fore and aft, the chuck and lock units with locked-in vertically extendable braces can be placed exactly where needed for a particular load. Also, since chuck and lock units with attached dunnage are not attached to a flatbed truck, they can be moved from truck to truck.

In use, the load is held on each side between vertical braces (like stakes) adjacent to the load and adjusted for the height of the load. Straps are supported by the tops of the extendable braces and go over the load. Extra tie-down lashings or straps (one or more) are used between extendable braces directly on the load to insure proper clamping to the flatbed. At the destination, prior to unloading, all straps or lashings are removed or loosened. However, the vertical braces are still in place preventing load from shifting sideways and causing an accident. The load is offloaded by a load lift over the side above the tops of the extendable braces. Off loading from the rear is also possible.

In the preferred embodiment, the parts are made of aluminum in robust gauges and dimensioned to accept dunnage commonly used in transport in the particular country of use. In the USA, dunnage is assumed to be either a single 4 by 4 piece of lumber or two 2 by 4's side by side. Thus the chuck and lock unit of this invention has attachment extensions (flanges) which are sized to receive this dunnage. Furthermore, stakes compatible with truck stake sockets are sized to receive 2 by 4's. For domestic use, the bottom sections of the extendable braces have a crossection matching that of a 2 by 4. The chuck section of the chuck and lock is also sized to receive a 2 by 4 piece of lumber.

In general, the present invention is a combination of a flatbed and an apparatus on the flatbed for preventing shifting of a load on said flatbed during offloading. Dunnage timbers are spaced along a length of the flatbed, wherein the timbers preferably extend at right angles to the length of the flatbed and toward side edges of the flatbed. Pairs of chuck and lock units, one on each side of the load, are preferably attached to the distal end of each dunnage timber. Each chuck and lock unit preferably comprises an L-shaped unit having a vertically extending socket portion and a horizontally extending base portion. Each said horizontally extending base portion receives a distal end of a dunnage timber and each said vertically extending socket portion receives a bottom end of a vertically extending brace, thereby attaching the brace to the dunnage timber.

The load being stabilized includes load members, such as pipes, lumber, timber, rods or other transportable commodities which are stacked on the dunnage timbers between said vertically extendable braces at opposite ends of the dunnage timbers. Each brace is height adjustable to match a height of the load.

A strap for each pair of chuck and lock units extends from one side edge of the flatbed over respective top ends of each pair of braces to an opposite side edge of the flatbed. These straps are attached to the flatbed and they secure the load during transit of the flatbed, so that the braces hold the load members in place during offloading, after removal of all straps at a destination.

The upper ends of the braces have a rounded top configuration to receive the straps, such as rounded-over edges for the straps to pass over, as well as side flares at the strap edges to maintain the straps in place on the top ends of the vertically extendable braces. Each brace has a bottom section extending into the socket portion of each chuck and lock unit. The bottom section has a vertical array of spaced holes, and the upper section telescopes into the bottom section, wherein the upper section has holes in alignment with the holes in the lower section for adjusting the height of each brace. A pin engages the holes of the upper and bottom sections to fix the upper section in place.

The horizontally extending base portion of each chuck and lock unit includes horizontally extending spaced flanges for enclosing a dunnage timber.

Additionally, the spaced flanges have apertures for nails or screws for attachment to each of the dunnage timbers, in which in each respective dunnage timber is a pair of half-width timbers which are aligned and flush against each other so that the spaced flanges enclose ends of both of the timbers in pair of vertically extending braces.

Preferably, each dunnage timber of each pair of dunnage timbers is shorter than the width of the load and is attached to one respective chuck and lock unit at a distal outer end. The timbers are adjacent to each other and staggered so that the chuck and lock units are not constrained to a fixed spacing, thereby allowing a spread between the vertically extendable braces at each end of the pair of timbers to be adjusted, by changing the overlap of the dunnage timbers in each pair, according to the size of the load to be contained and supported.

Optionally neither the dunnage timbers nor the chuck and lock units are attached to the flatbed, so that the apparatus may be moved to any flatbed without altering the flatbed.

In operation, the method of supporting a load of stacked load members on a flatbed and preventing shifting of the load members during offloading, includes the steps of:

a) arranging dunnage timbers on the flatbed spaced along a length of the flatbed, wherein the timbers extend at right angles to the length of the flatbed and toward side edges of the flatbed, and are not attached to the flatbed;

b) placing on the flatbed a pair of chuck and lock units for distal end of each dunnage timber, and attaching each chuck and lock unit to a distal end of each dunnage timber, each chuck and lock unit having a vertically extending socket portion, the chuck and lock units not being attached to the flatbed;

c) mounting a bottom end of a vertically extending brace in each socket portion;

d) stacking the load on the dunnage timbers between the vertically extendable braces; and e) attaching a strap over each pair of dunnage timbers by attaching one end of each strap to a side edge of the flatbed, stretching the strap over top ends of the vertically extendable braces enclosing the load between the vertically extendable braces, and attaching an opposite end of the strap to an opposite edge of the flatbed;

f) whereby the vertically extendable braces hold the load members in place during offloading after removal of the straps at a destination.

BRIEF DESCRIPTION OF THE DRAWINGS

The present invention can best be understood in connection with the accompanying drawings. It is noted that the invention is not limited to the precise embodiments shown in drawings, in which:

FIG. 4 is an exploded perspective view of the telescoping brace unit of this invention.

FIG. 5 (prior art) is a perspective view of a lock pin of a preferred type used both for adjusting the height of the extendable braces as well as locking the extendable brace in the socket of chuck and lock portions.

DETAILED DESCRIPTION OF THE INVENTION

In the description that follows, dunnage is assumed to be timber with a 4 by 4 crossection or using two 2 by 4 pieces adjacent to each other as is common in the USA. Dimensions to accommodate these common timber sizes are presented. In other jurisdictions, similarly sized timber of common metric dimensions would be used as dunnage and as stakes. Therefore the extendable brace and the chuck and lock units for those regions may deviate slightly from the dimensions discussed here.

Figure 1:
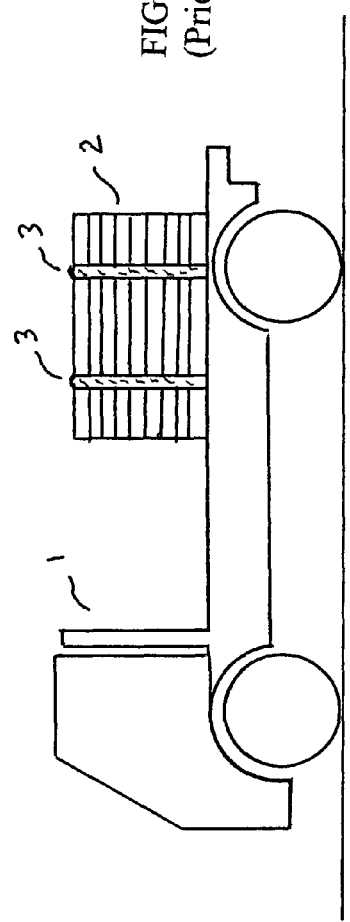
FIG. 1 (prior art) shows a side elevation schematic of a flatbed truck with a properly lashed load using two straps.
Figure 2:
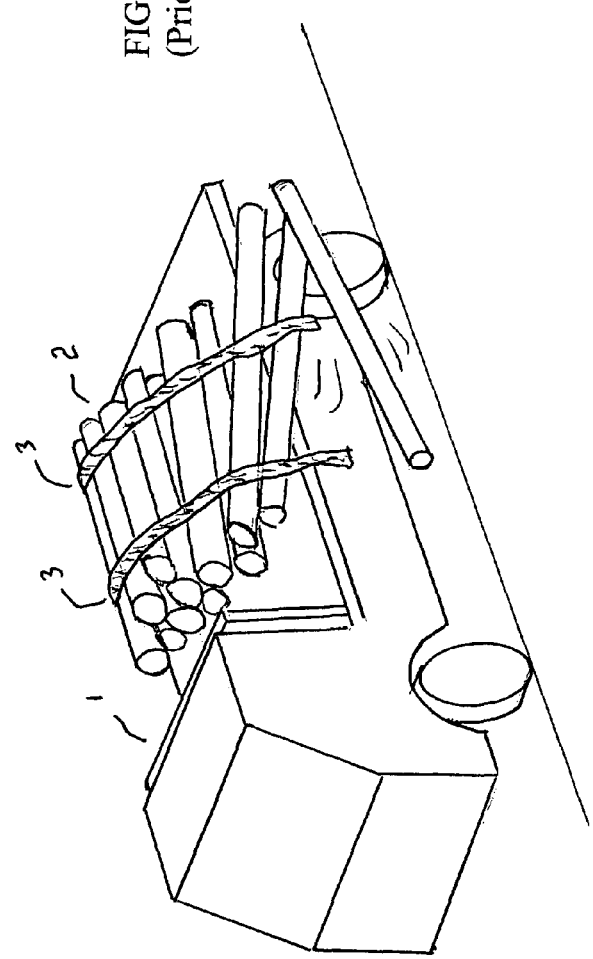
FIG. 2 (prior art) is a perspective schematic of the truck of FIG. 1 with the straps loosened at the destination showing the load shifting sideways and falling off the truck.

The problems of conventional load removal from flat bed platform trucks is shown in prior art drawing FIGS. 1 and 2. For example, prior art FIG. 1 shows a flatbed truck 1 with a load 2 clamped down by two straps 3 as is common recommended practice. Prior art FIG. 2 shows an accident in process as the straps 3 are detached from one side and load 2 is shifting and tumbling off the side of truck 1.

In contrast to the dangers and problems associated with the prior art depicted in FIGS. 1 and 2, the present invention is depicted in drawing FIGS. 3-4 and 6-9.

Figure 3:
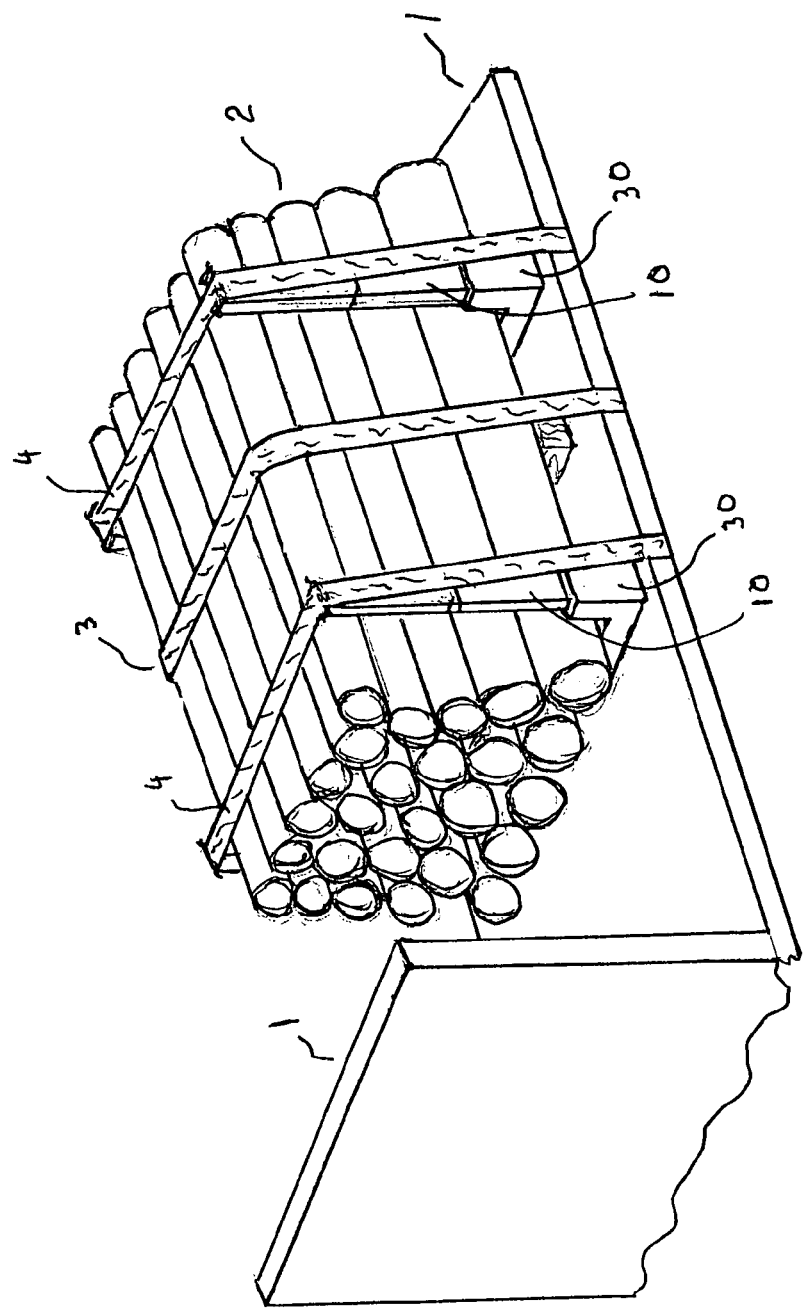
FIG. 3 is a perspective detail of a truck bed with a load secured by two chuck and lock systems with installed extendable braces on each side of the load and a lashing in the center.

For example, FIG. 3 shows flatbed truck bed 1 with load 2 properly attached using two extendable braces 10 of this invention per side locked into two chuck and lock units 30. Straps 4 go over extendable braces 10 and over load 2 while strap 3 goes directly over load 2 clamping it to bed 1.

Brace 10 is shown as an exploded view of the top section 12 which fits into bottom section 11 in FIG. 4. Preferred dimensions A and B of the width and depth of the base of section 11 are 3½" by 1½" which are identical to that of a common 2 by 4. Bump stops 17 at each corner about 8" from the bottom end can be formed by "upsetting" or welding to prevent section 11 from going through a bottomless stake socket if used that way on a truck bed so equipped. Alternatively, stop block 19 (in dashed lines) can be welded as shown for the same function. The preferred material for both sections 11 and 12 is ¼" thick aluminum stock welded or extruded to size. Through hole 15 near the bottom of section 11 is used to lock a brace into the chuck and lock unit 30 of this invention by using a pin 25 or equivalent as shown in prior art FIG. 5. Pin 25 has a squared retainer with tab lock. Dimensions D and E are approximately 4' each to permit telescoping adjustability from just over 4' to 7' by using the row of through holes 21 of bottom section 11 in registration with locking through hole 18 of section 12 using a pin 25 for locking. Note that dimension C is approximately one foot to insure a minimum of insertion contact for stability. Note that the top edge of section 12 is formed to receive a maximum width of 4" strap by virtue of the side flares 16 and rounded edges 14.

Figure 6:
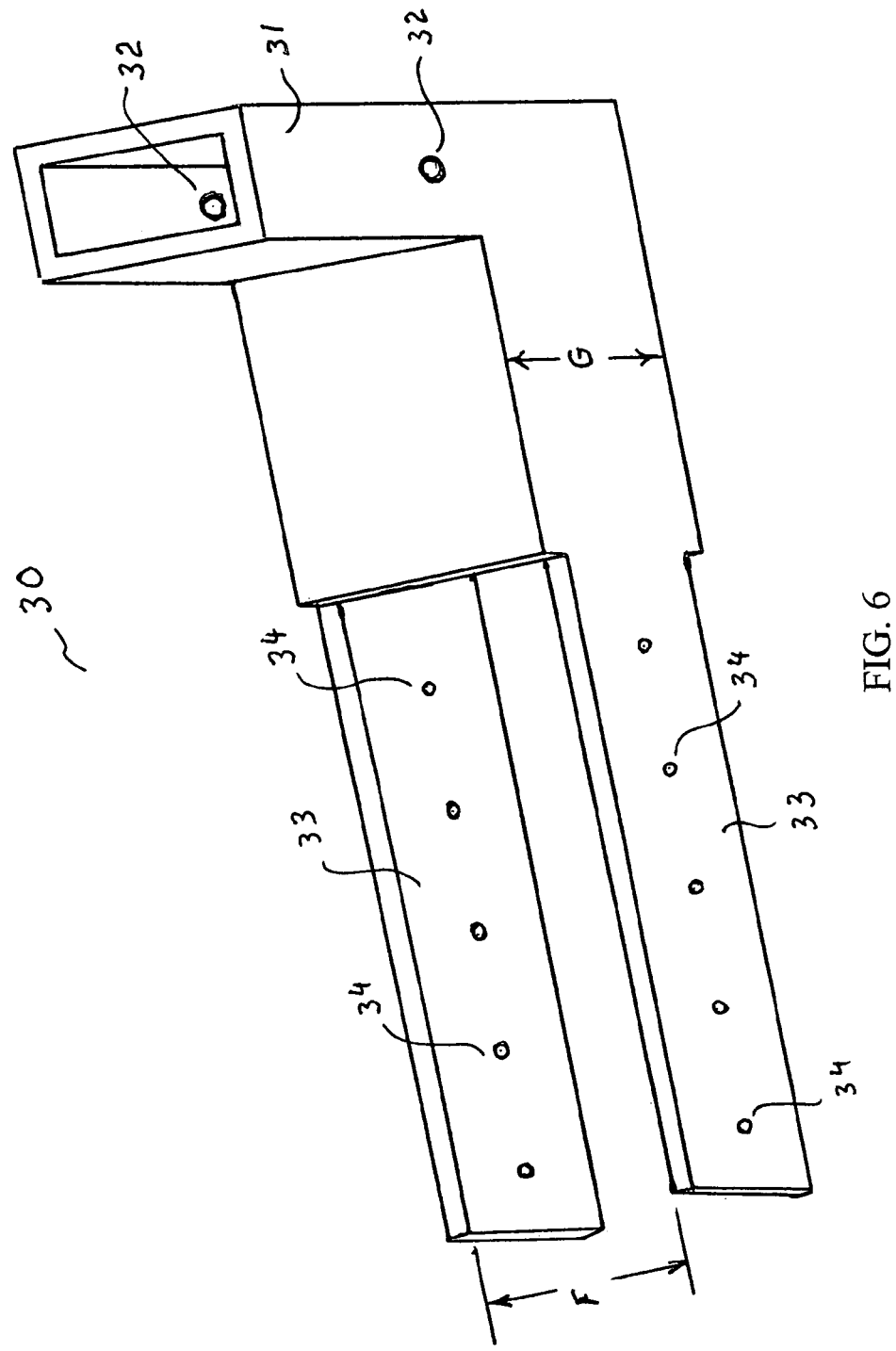
FIG. 6 is a perspective view of the chuck and lock unit of the invention prior to attachment to dunnage.
Figure 7:
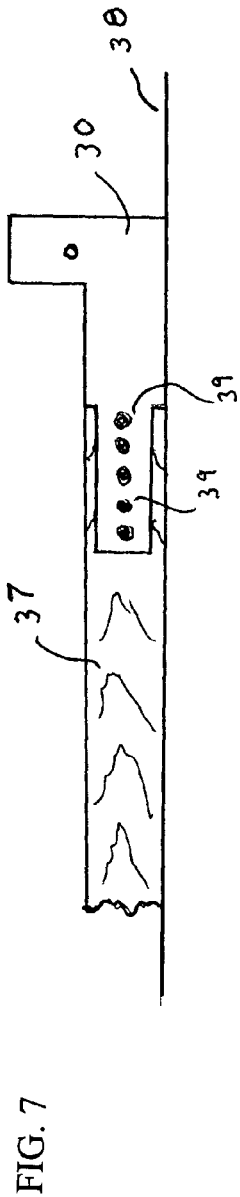
FIG. 7 is a side elevation showing a chuck and lock unit attached to a section of dunnage.

Chuck and lock unit 30 is shown prior to attachment of dunnage in FIG. 6. It is preferably an aluminum weldment of ½" stock to provide a rugged robust unit. The inside dimensions of socket portion 31 are dimensioned for an easy fit of the bottom of extendable brace 10 ("2 by 4" dimensions).

Through hole 32 is located to register with hole 15 of extendable brace 10, and a pin 25 is used for locking the two units together. The forward side extensions or flanges 33 are spaced apart to provide a close fit for dunnage, while height G is sized equal to dunnage height so that the end of the flat section becomes an extension of the dunnage to support any load portion. This can be seen more clearly in the side detail of FIG. 7 which shows the placement of dunnage 37 between the front extensions 33. Note that holes 34 are for screws or nails 39 to attach the dunnage timber 37. Extensions 33 are narrower than the height of dunnage 37 to facilitate accurate attachment by just placing dunnage 37 and chuck unit 30 on a flat surface.

Figure 8:
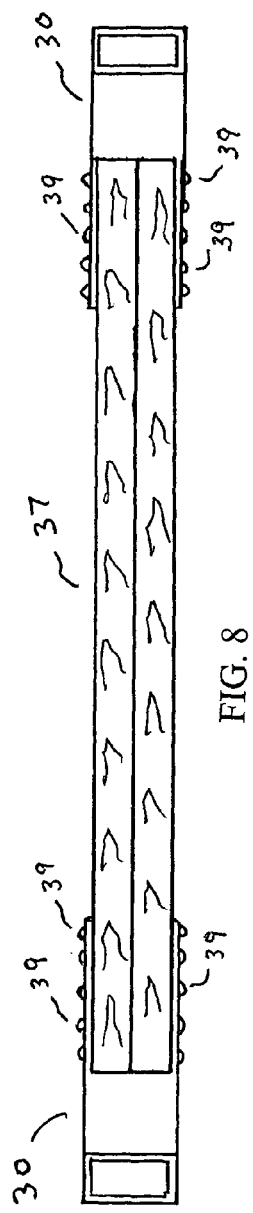
FIG. 8 is a top view of a piece of dunnage (two 2 by 4's) cut to size and attached to a chuck and lock unit at each end.
Figure 9:
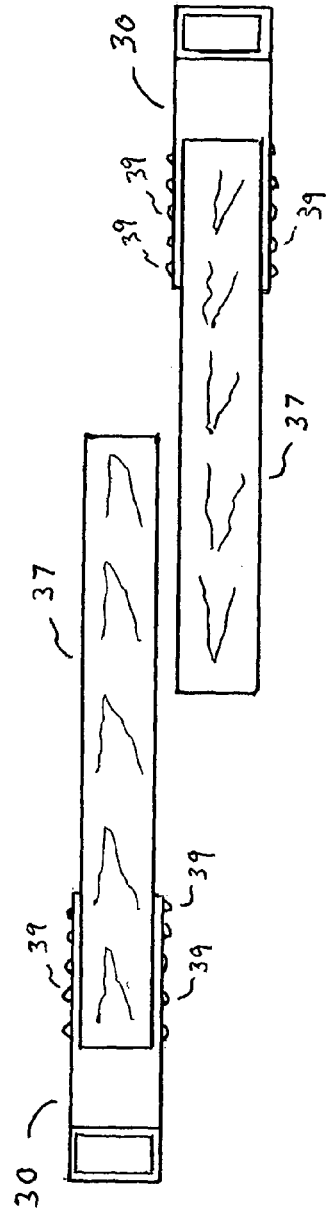
FIG. 9 is a top view of two pieces of dunnage, shorter than the width of the load, used adjacent to each other with one chuck and lock unit attached to opposite sides of each piece of dunnage.

Chuck and lock units 30 can be used in two distinct manners as shown in the top views of FIGS. 8 and 9. In FIG. 8, one unit 30 is attached to each end of dunnage 37 which is cut to accommodate a particular load width. In FIG. 8 the option of using two adjacent 2 by 4's as dunnage is illustrated. In FIG. 9, two shorter lengths of dunnage 37 are used and placed adjacent to each other (preferably touching). One chuck and lock unit 30 is attached to one end of each piece as shown. The advantage of this technique is that this configuration can accommodate a range of load widths with two precut dunnage 37 lengths.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. In combination, a truck flatbed and apparatus on said flatbed for preventing shifting of a load on said flatbed during offloading, comprising:
   dunnage timbers spaced along a length of said flatbed, said flatbed having side edges, said timbers extending at right angles to the longitudinal axis of said flatbed and toward said side edges of said flatbed;
   said load resting on said dunnage timbers;
   pairs of chuck and lock units spaced along a length of said flatbed, each pair having one lock unit adjacent each side edge of said flatbed;
   each chuck and lock unit comprising being L-shaped and having one leg on said flatbed extending horizontally at right angle to the longitudinal axis of said flat bed and a second, upwardly extending leg at a distal end of said horizontal leg adjacent said side edge of said flatbed;
   said upwardly extending leg having a vertically extending socket portion;
   said chuck and lock units resting on and being unattached to said flatbed, thereby being readily repositionable from one flatbed to another;
   each said horizontally extending leg having a pair of spaced side extensions for receiving an end of one or more dunnage timbers;
   each said socket portion of said upwardly extending legs receiving a bottom end of a vertically extending savior extending the full height of said load;
   said load comprising members stacked on said dunnage timbers between said saviors at opposite ends of said dunnage timbers;
   a strap for each pair of chuck and lock units extending from one side edge of said flatbed over top ends of each pair of saviors to an opposite side edge of said flatbed for securing said load between saviors, said straps being releasably attached to side edges of said flatbed; and
   whereby said saviors hold said load members in place during offloading after removal of all straps at a destination; and
   means for adjusting the height of each upwardly extending leg for the height of the load.

2. The combination of claim 1 having means for adjusting the height of each upwardly extending leg for the height of the load.

3. The combination of claim 2 in which upper ends of said saviors have a configuration to receive said straps, said configuration comprising rounded-over edges over which said straps pass over and side flares at strap edges to maintain said straps in place on said upper ends of said saviors.

4. The combination of claim 3 in which said height adjusting means comprises each savior having a bottom section and an upper section, said bottom section extending into said socket portion of said chuck and lock unit, said bottom section having a vertical array of spaced holes, and said upper section telescoping into said bottom section, said upper section having holes in alignment with said holes in said bottom section for adjusting the height of said savior, and a pin for engaging the holes of said upper and bottom sections for fixing said upper section in place.

5. The combination of claim 4 in which said spaced side extensions have apertures for nails or screws for attachment to each of said dunnage timbers.

6. The combination of claim 5 in which in each said dunnage timber is a pair of half-width timbers, said pair of half-width timbers thereof are aligned and flush against and are slidable with respect to each other to adjust for the width of said flat bed and/or said load so that one or both half-width timbers are enclosed by said spaced side extensions.

7. The combination of claim 5 in which the height of said side extensions is less that the height of said dunnage timber so that said load rests only on said dunnage timber.

8. The combination of claim 4 having a pair of dunnage timbers for each pair of pair of chuck and lock units in which in each dunnage timber of said pair of dunnage timbers is shorter than the width of the load so that only one dunnage timber is received by a pair of spaced side extensions, thereby staggering of dunnage timbers in each pair thereof and thereby allowing a spread between saviors at each end of said pair of timbers to be adjusted by changing the overlap of the dunnage timbers in each pair, according to the size of the load to be contained and supported.

9. A method of supporting a load of stacked load members on a flatbed and preventing shifting of said load members during offloading, comprising the steps of:
   arranging dunnage timbers on said flatbed spaced along a length of said flatbed, said timbers extending at right angles to the length of said flatbed and toward side edges of said flatbed, and not attached to said flatbed;
   placing on said flatbed a pair of chuck and lock units for each dunnage timber, and attaching each chuck and lock unit to an end of each dunnage timber, each chuck and lock unit having a vertically extending socket portion, said chuck and lock units not being attached to said flatbed;
   mounting a bottom end of a vertically extending savior in each socket portion;
   stacking said load on said dunnage timbers between said saviors; and
   attaching a strap over each pair of dunnage timbers by releasably attaching one end of each strap to one side edge of said flatbed, stretching said strap over top ends of said saviors enclosing the load between said saviors, and attaching an opposite end of said strap to an opposite side edge of said flatbed;

whereby said saviors hold said load members in place during offloading after removal of said straps at a destination.

10. The method of claim 9 in which said saviors are extensible to allow accommodation of different heights of stacked load members.

11. The method of claim 10 in which each dunnage timber is shorter than the width of the load, a pair thereof are used together and are staggered to accommodate different widths of said load.

12. The method of claim 10 in which each said dunnage timber is a pair of half-width timbers, said pair of half-width timbers are adjacent to each other, are of the same length, and ends thereof are flush, whereby each chuck and lock unit is attached to ends of adjacent half-width dunnage timbers.

13. A chuck and lock system for preventing the load on a flatbed truck from shifting at the destination during offloading comprising:

a plurality of vertically extendable braces;

each said vertically extending brace associated with a movable chuck and lock, each said movable chuck and lock operating as a socket locking each respective extendable brace in place;

each said chuck and lock unit attached to dunnage underneath the load;

wherein the load is held on each side thereof between said vertically extendable braces, said braces being adjusted for the height of the load;

a plurality of straps wrapping over said load upon said flatbed truck, said straps being supported by a respective pair of vertically extendable braces; and whereby said vertically extendable braces prevent the load from shifting sideways and causing an accident while being offloaded.

* * * * *